Oct. 4, 1966 G. F. ROACH ETAL 3,277,299
METHOD OF LOGGING A BOREHOLE LOGGING FOR CHLORINE
Filed July 9, 1962 4 Sheets-Sheet 1
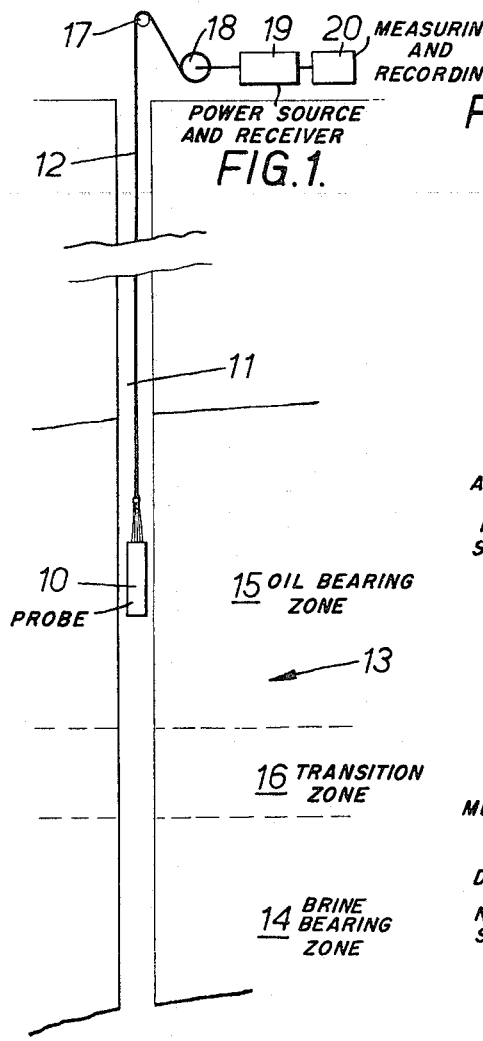
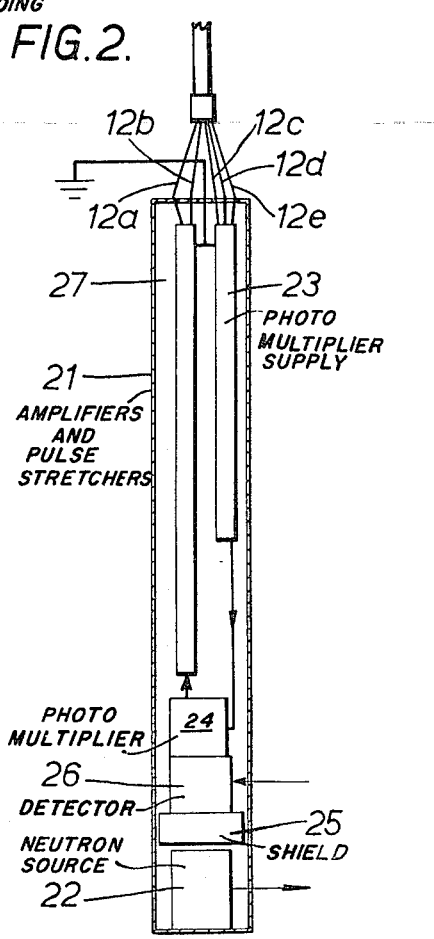
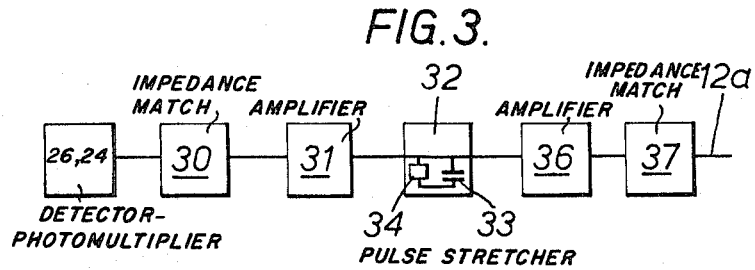
INVENTORS
GARY FRANCIS ROACH
ERIC HENRY WARD
BY
Morgan, Finnegan, Durham & Pine
ATTORNEYS

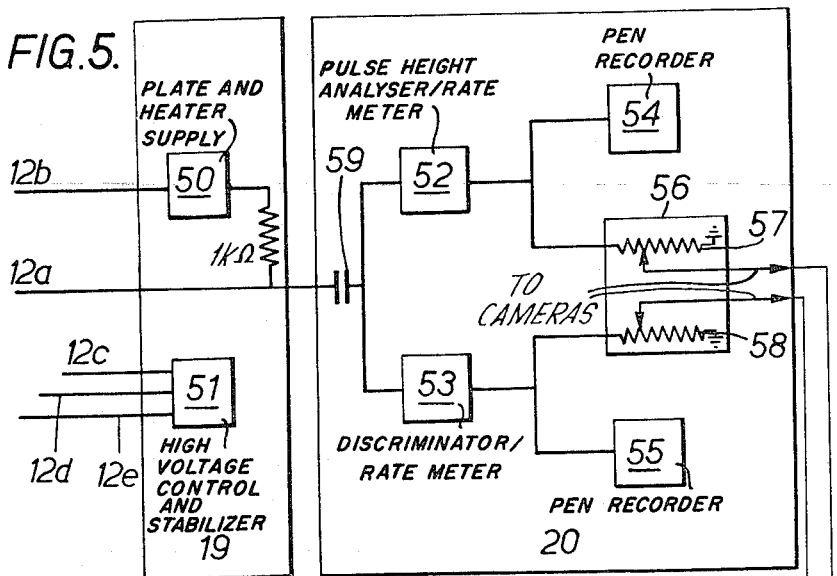
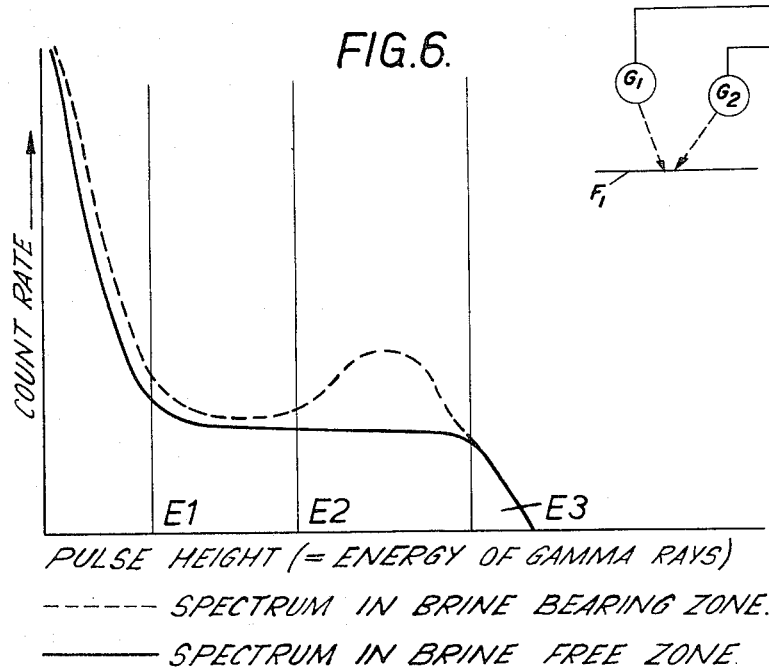

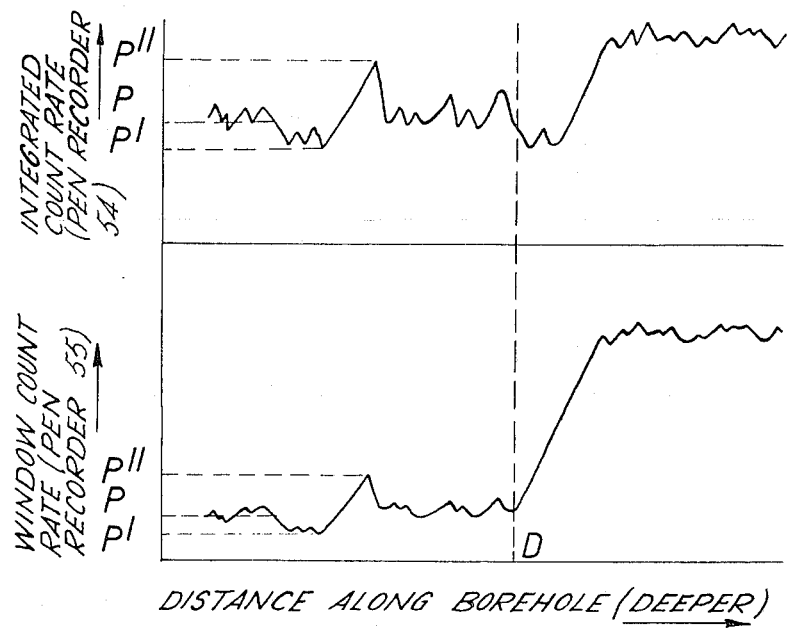
FIG. 7.
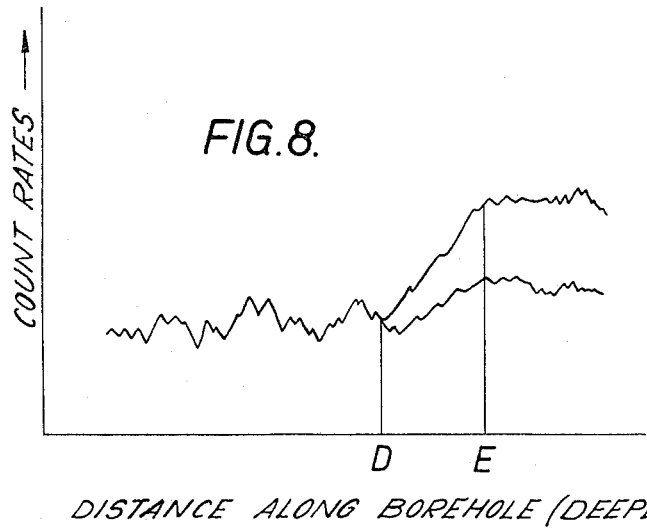

United States Patent Office 3,277,299
Patented Oct. 4, 1966

3,277,299
METHOD OF LOGGING A BOREHOLE LOGGING FOR CHLORINE
Gary Francis Roach and Eric Henry Ward, both of Sunbury-on-Thames, Middlesex, England, assignors to The British Petroleum Company Limited, London, England, a British joint-stock corporation
Filed July 9, 1962, Ser. No. 208,190
Claims priority, application Great Britain, July 14, 1961, 25,592/61
5 Claims. (Cl. 250—71.5)

This invention relates to a method of and apparatus for logging a borehole to detect in the formations traversed by the borehole, the presence or absence of chlorine at any particular level and to determine the relative abundance of the chlorine. Many boreholes which pass through an oil-bearing formation also pass through a brine-bearing formation adjacent to the oil-bearing formation. This invention is particularly suitable for determining the position of the oil/brine interface and/or the extent of the transition zone in such a borehole.

A proposed method of logging a borehole comprises, irradiating a known brine-free formation and a known brine-saturated formation with neutrons, detecting the occurrence and energy of the gamma rays emitted promptly by the nuclei of each of the formations, measuring the count rate of the rays as functions of their energy, selecting an energy range within which the count rates in the respective formations exhibit a maximum difference, irradiating the formations traversed by the borehole with neutrons from a source moving through the borehole, and measuring the count range of the gamma rays within the selected range emitted promptly by the nuclei of the traversed formations as a function of distance along the borehole.

According to one aspect of the present invention we provide a method of logging a borehole comprising irradiating a known brine-free formation and a formation known to have a high brine concentration with neutrons from a source situated in the borehole, detecting the occurrence and energy of gamma rays emitted promptly by the nuclei of each of the formations, measuring the count rates of the rays as functions of their energy, selecting an energy range within which the difference between the count rate obtained from the brine-free formation and the count rate obtained from the brine-containing formation is maximal and also selecting an energy minimum below which substantially all high count rate low energy background radiation occurs, irradiating the formations traversed by the borehole with neutrons from the same source moving through the borehole, detecting the occurrence and energy of gamma rays emitted promptly by formations near the neutron source, measuring the count rates of (a) the rays having energies within the selected energy range and (b) the rays having energies greater than the selected energy minimum and recording each of the measurements as a function of distance along the borehole in such manner that the two records are substantially superimposed when the count rates relate to radiation produced from a brine-free formation, whereby the presence of chlorine at a level is indicated by a divergence in the record relating to radiation having energies above the selected minimum.

According to another aspect of the present invention we provide apparatus for logging a borehole comprising a source of neutrons and a scintillation detector capable of delivering electrical pulses of an amplitude substantially portional to the energy of incident gamma ray quanta, both mounted within a probe adapted to be lowered into a borehole, means for moving the probe through the borehole, a pulse height analyzer and rate meter circuit for measuring the count rate of pulses within a selected amplitude range, a sweep control for the analyser circuit for continuously varying the channel position over the full amplitude range of the pulses so that a spectrum of the pulses can be recorded, a discriminator and rate meter circuit for measuring the count rate of pulses with an amplitude above a selected minimum, a recording galvonometer for recording the count rate measured by the pulse height analyser and ratemeter circuit in a predetermined amplitude range and a recording galvanometer for recording the count rate measured by the discrimiator and ratemeter circuit, means for controlling the galvanometers from the lowering means so that the count rate is displayed as a function of distance along the borehole, and means for adjusting one or both the galvanometers whereby the two individual records can be superimposed when the two count rates refer to a brine-free formation.

The invention will now be described by way of example with reference to the accompanying drawings, in which:

FIGURE 1 shows, in diagrammatic form, an apparatus for logging boreholes,

FIGURE 2 shows, in diagrammatic form, the probe shown in FIGURE 1,

FIGURE 3 is a block schematic circuit of the probe shown in FIGURE 2,

FIGURE 5 is a block schematic diagram of the surface electronics,

FIGURE 6 shows a typical pair of spectra obtained from a brine-free and a brine-bearing zone, FIGURE 7 shows separate plots of the two count rates, FIGURE 8 shows a combined plot of the two count rates.

Figure 4:
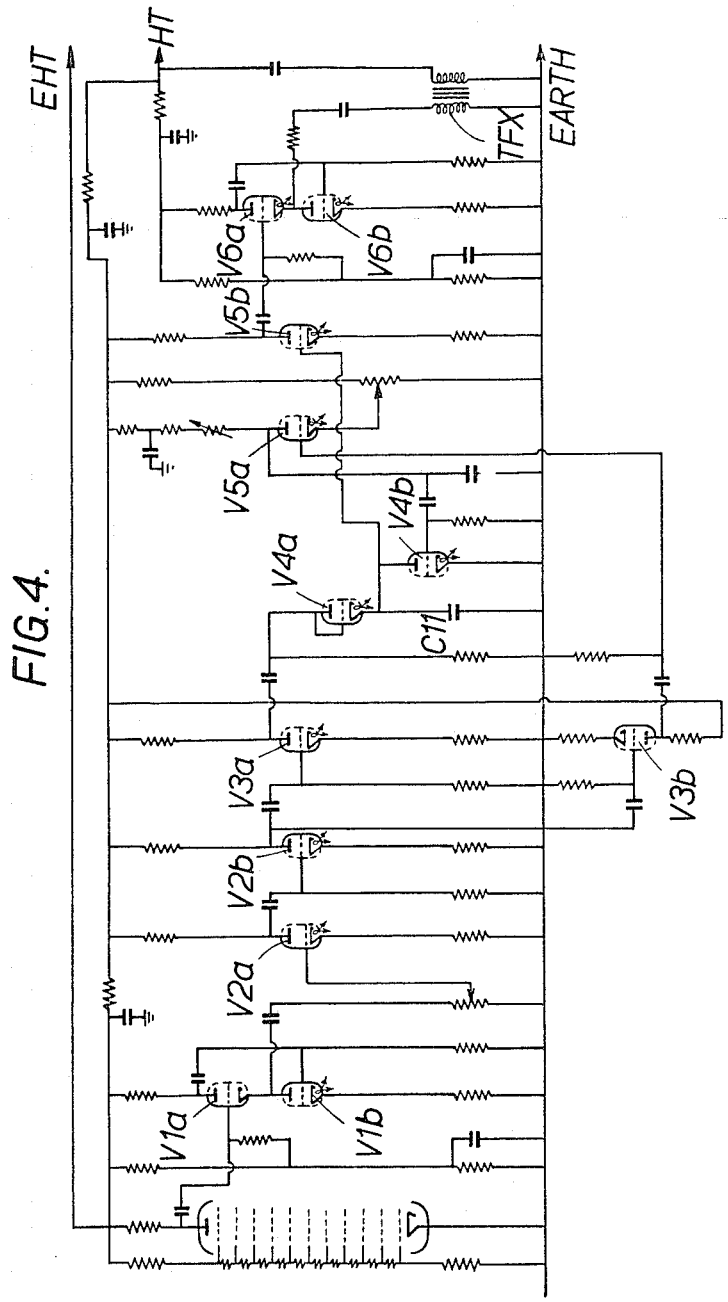
FIGURE 4 is a circuit diagram of the same probe.

The apparatus shown in FIGURE 1 consists of a probe 10 which can be moved up and down a borehole 11 by means of a cable 12. The cable 12 is a multiconductor electric cable, and it is, of course, fully insulated and armoured to protect it from the borehole fluids. This gives the cable 12 sufficient mechanical strength to enable it to support the probe 10. The cable 12 therefore also serves as the lifting cable.

The cable 12 passes over a winding head 17 and is wound onto a winch 18. The electrical conductors pass from the winch 18 to a source of electric power 19 which supplies all the power to operate the electronic equipment contained in the probe 10. The power source 19 also receives the electric signals generated by the probe, filters them from the power supply and passes the signals to the measuring and recording circuits 20. There is also a mechanical linkage between the winch 18 and the recording circuit 20 to enable signals to be recorded as a function of distance along the borehole.

The probe 10 shown in FIGURE 1, is shown in greater detail in FIGURE 2. The probe 10 consists of a pressure casing 21 which contains the subsurface equipment and protects it from the borehole fluids. The pressure casing 21 contains a polonium/beryllium neutron source 22.

The neutrons produced by the source 22 pass out of the pressure casing 21 and, when the probe is in a borehole, into the surrounding formations where they come under the influence of its atoms and it is desired that some neutrons will be captured by the atoms. Neutrons having thermal energies are particularly suitable for this reaction but neutrons having higher energies will lose energy and ultimately be moderated to thermal energy levels. If a neutron is captured a compound nucleus is formed which is in a very excited state. The excess energy is emitted as radiation leaving a recoil nucleus which is an isotope of the capturing nucleus. (The resulting recoil nucleus may or may not be radioactive.) The decay of the compound nucleus into the recoil nucleus has a half life of $10^{-14}$ seconds and in consequence the radiation during the decay is known as the "prompt radiation." It is this prompt radiation which is to be detected but other radiation, e.g. that which is due to any decay of the recoil nucleus, will be detected if it is present.

Some of the prompt radiation re-enters the probe 10 which contains a scintillation crystal 26 to detect the radiation. The scintillation crystal 26 is made of sodium iodide doped with thallium. A lead shield 25 is situated between the neutron source 22 and the scintillation crystal 26. The lead shield prevents radiation passing from the source 22 to the scintillation crystal 26.

The scintillation crystal 26 receives gamma radiation from the formation surrounding the probe and each quantum received is converted into a flash of electromagnetic radiation, the energy in the flash being equivalent to the energy of the quantum. The flashes are received by a photomultiplier tube 24 which produces voltage pulses whose amplitudes are proportional to the energies of the original gamma ray quanta, these voltage pulses are processed in subsurface electronics 27 and transmitted to the surface for further processing and recording. The extra high tension required by the photomultiplier tube 26 is generated by the E.H.T. generator 23 which is controlled from the surface.

The probe is supported in the borehole by the electric cable 12 (as described with reference to FIGURE 1). The cable 12 comprises five separate conductors as follows:

12a carries HT for the electronics 27 from the surface to the probe and the signal from the proble to the surface.

12b carries current for the valve heaters of the electronics 27.

12c carries a sample of the E.H.T. voltage to the surface.

12d carries control signals from the surface to the E.H.T. generator 23.

12e is the common earth return.

The probe shown in FIGURE 2 may be modified as follows:

(1) The neutron source 22 may be a linear accelerator which directs a stream of charged particles at a suitable target.

(2) The E.H.T. generator 23 may be removed and the E.H.T. supplied from the surface. This simplifies the equipment as a whole and the subsurface equipment in particular but it requires feeding a high voltage down the cable 12 and it may be preferred to avoid this.

The output of the photomultiplier 24 consists of a series of voltage pulses each having a duration of about 1–2 microseconds and these pulses have to be amplified and, preferably, increased in duration to 30–50 microseconds before they are sent to the surface. A suitable circuit, shown in block schematic form in FIGURE 3, consists of the photomultiplier 24 connected to a pulse lengthening circuit 32 via a White cathode follower 30 and a three-stage, variable-gain amplifier 31. The cathode follower 30 matches the impedance of the photomultiplier to the impedance of the succeeding electronics and the amplifier 31 amplifies the pulses so that their amplitude range is suitable for the operation of the pulse lengthening circuit 32. The variable gain enables the amplitudes of the pulses received by the pulse lengthening circuit to be controlled.

As it is difficult to transmit a pulse having a duration of 1–2 microseconds up a long transmission cable the duration of the individual pulses is increased by the pulse lengthening circuit 32. A suitable circuit is described in the provisional specification accompanying United Kingdom patent application 44,758/60; the essential features of this circuit are a storage capacitor 33 for receiving and storing an electrical pulse and a timing/discharge circuit 34 for discharging the capacitor after a fixed interval. The output of the pulse lengthening circuit 32 consists of the voltage stored on the storage capacitor 33. Thus the output consists of a pulse having substantially the same amplitude as the initiating pulse but having a duration determined by the timing discharge circuit 34.

The output of the pulse lengthening circuit is amplified in the amplifying stage 36 and fed to conductor 12a via an impedance matching stage 37 which consists of a White cathode follower and a step down transformer.

A circuit diagram is shown in FIGURE 4 and in this diagram the valves V1a and V1b belong to the cathode follower 30 and the valves V2a, V2b and V3a to the amplifier 31. The capacitor C11 is the storage capacitor 33 of the pulse lengthening circuit 32 and it receives its charge via the rectifying) valve V4a. The discharge path is via the valves V3b and V5a so that the discharge path is blocked until the cut-off bias is discharged via the resistance capacitance leak in the grid circuit of V4b (which is also the anode circuit of V5a).

The voltage on the storage capacitor C11 is fed to the grid of valve V5b which belongs to the amplifier 36; valves V6a and V6b belong to the cathode follower of impedance matching stage 37 and feed the step-down transformer TFX which has a step-down ratio of 5:1.

As shown in FIGURE 1 the surface equipment includes a source of electric power 19 and measuring the recording circuits 20. These are shown, block diagrammatically, in FIGURE 5.

The power source 19 comprises an H.T. and valve heater power pack 50 and an E.H.T. control and stabilizer unit 51. The power pack 50 supplies H.T. to the subsurface electronics via conductor 12a and valve heater power via conductor 12b. The unit 51 supplies control voltage to the (subsurface) E.H.T. generator 23 via the conductor 12d. A low voltage signal, proportional to the E.H.T. output, is received via conductor 12c. This enables the E.H.T. to be continuously measured and departures from the desired voltage are corrected by signals sent via conductor 12d.

The signal pulses are received from conductor 12a and are passed to the measuring and recording circuits 20, via a capacitor 59 to isolate the H.T. The measuring cricuits consist of a pulse height analyser/ratemeter 52 (an "EKCO" N. 600) and a discriminator/ratemeter 53 (an "EKCO N. 624), connected in parallel.

The "EKCO" N. 600 has the ability to scan suitable voltage (energy) ranges and also to count the number of pulses received within a particular voltage range, and it has a pre-amplifier for the pulses.

The output of the "EKCO" N.600 is a D.C. signal proportional to the rate at which pulses within the set range are received. This output is recorded on a pen recorder 54.

The "EKCO" N.624 is similar to the N.600 but it can only measure the countrate of pulses having an amplitude above a set minimum. The output is recorded on a pen recorder 55.

The D.C. output of each of the measuring circuits 52 and 53 is passed to the control box 56 which consists of an earthed multiplier resistance 57 connected in the measuring circuit 52 and a similar earthed multiplier resistance 58 connected in the measuring circuit 53. A signal is picked up from (different) intermediate points of each multiplier resistance 57, 58 and each signal is recorded on film by a mirror galvanometer $G_2$, $G_1$, respectively, both mirror galvanometers recording on one piece of film $F_1$. The purpose and use of this equipment will be explained below.

The use of the equipment described above to measure the position of an oil/brine interface will now be explained with reference to FIGURE 1.

The probe 10 is placed in the borehole 11 and lowered into the known brine-bearing zone 14. A gamma-ray spectrum is plotted by setting the window width of the recording means 52 to a desired minimum and moving the centre of the window over the energy range of interest by means of a sweep control (not shown in any drawing). The required spectrum is plotted by the pen recorder 54 using the sweep control to move the paper of the pen recorder. A typical spectrum is shown by the broken trace of FIGURE 6.

The probe is raised into the known oil bearing zone 15 and a similar spectrum is plotted (to the same scale as the spectrum obtained from the brine-bearing zone 14). This is shown by the continuous trace of FIGURE 6.

As shown in FIGURE 6 the count-rate from the brine-bearing zone 14 is slightly higher than the count-rate from the brine-free zone 15 except that in the range $E_2 E_3$ the count-rate from the brine-bearing zone 14 exhibits a "peak" which is due to characteristic radiation from chlorine atoms and this peak is therefore a feature of a spectrum from a brine-bearing zone. Thus inspection of the two spectra plotted on common axes as in FIGURE 6 enables the energy levels $E_2$ and $E_3$ to be chosen so as to maximise the extra count-rate obtained from a brine-bearing zone as compared with the count-rate obtained from a brine-free zone. The peak always occurs between about 6-7.7 m.e.v. since this energy level is characteristic of chlorine but the best energy range depends upon borehole conditions and therefore it is preferred to select the energy range empirically. This also offers the advantage that it is unnecessary to use an apparatus which is calibrated for energy levels.

The position of the interface may be found by plotting only the count rate within the range $E_2 E_3$ but this is inaccurate due to random variations of the count-rate. Thus the count-rate in the range $E_2 E_3$ will increase on entering a brine-containing zone but the beginning of the increase may be obscured by a fall (or rise) in the general level of radiation. According to this invention the general level of radiation is also recorded and the increase in count-rate from chlorine atoms is detected in comparison with the general radiation level. (The count-rate for energies in the range $E_2 E_3$ will hereinafter be called "the window count-rate.")

From FIGURE 6 it can be seen that, for both zones, there is a high count-rate for low energy levels but this high count-rate falls rapidly until a plateau is reached. A minimum energy level $E_1$ may be selected to coincide with the (low energy) commencement of this plateau. (The count-rate for energies greater than $E_1$ will hereinafter be called "the integrated count-rate.")

Once the energy levels $E_1$, $E_2$ and $E_3$ have been obtained the probe 10 is moved through the borehole and the window count-rate is recorded as a function of borehole depth by the pen recorder 54 and the integrated count-rate by the pen recorder 55, (by linking the paper movements to the winch 18).

This provides two plots of different count-rates against borehole depth and both count rates depend on the general level of radiation. Since the integrated count-rate includes the window count-rate both count-rates depend on the abundance of brine in the borehole but the relative effect is greater on the window count-rate than upon the integrated count-rate. Thus as the probe moves into the transition zone 16 the window count-rate will increase with respect to the integrated count-rate. Since both count-rates share certain sources of variations the relative increase will depend only on the sources of variation which affect the two count rates unequally and since the two count rates have been particularly chosen so as to make brine concentration such a factor the relative increase of the window count rate compared with the integrated count rate is a particularly sensitive indication of the presence of brine in the borehole.

This is illustrated by the typical curves showing integrated count-rate and window count-rate plotted against distance along the borehole (as a common abscissa) given in FIGURE 7.

It will be observed that at about the depth D both traces increase and in particular the window trace goes up more than the integrated trace. This indicates that D is the beginning of the transition zone but the random variation of the traces makes it difficult to spot the start (and the finish) of the transition zone. It is easier to spot the start of the transition zone if the two curves can be superimposed and this may be done by the following technique.

Having noted the approximate position of D the approximate extent of the brine-free zone is known and maximum and minimum count-rate for each count-rate in the brine-fresh zone can be noted. Let these be:

$p''$ maximum count-rate for integrated trace
$p'$ minimum count-rate for integrated trace
$P''$ maximum count-rate for window trace
$P'$ minimum count-rate for window trace As stated these four quantities relate to the brine-free zone; $P''$ and $P'$ are taken from pen recorder 54; $p''$ and $p'$ from pen recorder 55.

Once $P''$, $P'$, $p''$ and $p'$ have been obtained, two multiplication factors are calculated as follows:

$$K = \frac{A}{P'' - P'} \quad \text{and} \quad k = \frac{A}{p'' - p'}$$

$$\left(\text{note that } K = \frac{p'' - p'}{P'' - P'} k\right)$$

where A is an arbitrary constant (chosen so as to give suitable readings on the mirror galvanometer). The probe is returned to the brine-free zone 15 and the count-rates are noted on both pen recorders and mirror galvanometers (without moving the probe and without any necessity to record the count-rates). Adjustment of the multiplier resistances 57 and 58 enables the readings on mirror galvanometers to be set to any scale position for any reading on the corresponding pen recorder.

One is therefore set to read $A/P'' - P'$ ($=K$) times the pen recorder 54; the other is set read $A/p'' - p'$ ($=k$) times pen recorder 55 (by adjustment of the multiplier resistance 57 and 58 respectively). When these ratios have been adjusted the zero of one mirror galvanometer (preferably the one recording the window trace) is offset and by this means the two lightspots of the two mirror galvanometers may be brought into coincidence. Once this has been done the two spots remain coincident in spite of variations of the radiation down the hole so long as the probe remains in the brine-free zone. The apparatus is now fully adjusted and a log may be recorded by moving the probe 10 through the borehole and recording both count-rates as a function of borehole depth, on film by the mirror galvonometers (by linking film movements to the winch 11). The appearance of the log will be that of a single trace which splits into two traces: the point at which the single trace becomes two traces indicates the beginning of the transition zone; the point at which the two traces become roughly parallel indicates the end of the transition zone. A typical combined curve is shown in FIGURE 8.

We claim:
1. A method of logging a borehole comprising in combination the steps of irradiating a known brine-free formation and a formation known to have a high brine concentration with neutrons from a source situated in the borehole, detecting the occurrence and energy of gamma rays emitted promptly by the nuclei of each of the formations, measuring the count rates of the rays as functions of their energy, selecting an energy range within which the difference between the count rate obtained from the brine-free formation and the count rate obtained from the brine-containing formation is maximal and also selecting an energy minimum below which substantially all high count rate low energy background radiation occurs, irradiating the formations traversed by the borehole with neutrons from the same source moving through the borehole, detecting the occurrence and energy of gamma rays emitted promptly by formations near the neutron source, measuring the count rates of (a) the rays having energies within the selected energy range and (b) the rays having energies greater than the selected energy minimum and recording each of the measurements as a function of distance along the borehole in such manner that the two records are substantially superimposed when the count rates related to radiation produced from a brine-free formation, whereby the presence of chlorine at a level is indicated by a divergence in the record relating to radiation having energies above the selected minimum.

2. A method as claimed in claim 1 wherein the detection of the gamma rays comprises intercepting the gamma rays with a scintillation crystal arranged so that each quantum of gamma ray energy detected is converted to a flash of electromagnetic radiation, transforming the flashes of electromagnetic radiation into a series of electrical pulses whose amplitudes are substantially proportional to the energies of the gamma ray quanto and whose durations are substantially the same as the durations of the corresponding flashes, and transmitting the pulses from a location in the borehole to the surface.

3. A method as claimed in claim 2 wherein the duration of each individual pulse is increased before it is transmitted to the surface.

4. A method as claimed in claim 3 wherein the duration of each individual pulse is increased by causing each pulse to charge a storage capacitor which maintains its charge until it is discharged after a time delay, the voltage on the storage capacitor being used as the output which is amplified and passed to the surface.

5. A method as claimed in claim 1 wherein the records of the measurements are recorded on film using mirror galvanometers.

References Cited by the Examiner

UNITED STATES PATENTS

| | | | |
|---|---|---|---|
| 2,686,266 | 8/1954 | Pringle et al. | 250—71.5 |
| 2,910,591 | 10/1959 | Baker | 250—71.5 |
| 2,978,585 | 4/1961 | Rabson | 250—83 |
| 3,008,048 | 11/1961 | Scherbatskoy | 250—71.5 X |
| 3,090,867 | 5/1963 | Swanson et al. | 250—71.5 X |
| 3,108,188 | 10/1963 | Dewan et al. | 250—83.6 X |

RALPH G. NILSON, *Primary Examiner.*

ARCHIE R. BORCHELT, *Examiner.*